F. J. HUNDLEBY AND H. M. LAWSON.
SPLASH GUARD FOR THE WHEELS OF MOTOR VEHICLES.
APPLICATION FILED NOV. 25, 1921.

1,421,239.

Patented June 27, 1922.
2 SHEETS—SHEET 1.

INVENTOR
F. J. Hundleby
H. M. Lawson
Cowden O'Brien
attys

F. J. HUNDLEBY AND H. M. LAWSON.
SPLASH GUARD FOR THE WHEELS OF MOTOR VEHICLES.
APPLICATION FILED NOV. 25, 1921.

1,421,239.

Patented June 27, 1922.

UNITED STATES PATENT OFFICE.

FREDERICK J. HUNDLEBY, OF DROYLSDEN, AND HAROLD M. LAWSON, OF MANCHESTER, ENGLAND.

SPLASH GUARD FOR THE WHEELS OF MOTOR VEHICLES.

1,421,239.  Specification of Letters Patent.  Patented June 27, 1922.

Application filed November 25, 1921. Serial No. 517,819.

*To all whom it may concern:*

Be it known that we, FREDERICK JOHN HUNDLEBY and HAROLD MILLAR LAWSON, British subjects, residing at Droylsden, county of Lancaster, England, and at Manchester, county of Lancaster, England, respectively, have invented certain new and useful Improvements in Splash Guards for the Wheels of Motor Vehicles, of which the following is a specification.

This invention relates to splash guards for the wheels of motor vehicles, more particularly for commercial vehicles, such as lorries and trailers, to prevent the lateral splashing of mud or water.

The invention comprises a splash guard built up of a flanged sleeve to fit upon or to be attached to the hub or other part of the wheel, a dished plate or rim attached or affixed to the hub sleeve, and a ring of rubber or rubber composition or fabric or other flexible material attached to the intermediate rigid plate preferably by means of a metal or other ring, the combination forming a rotary or circular splash guard by the rotary motion of which the splash will be carried up into the wing.

The invention will be fully described with reference to the accompanying drawings.

Figure 1:
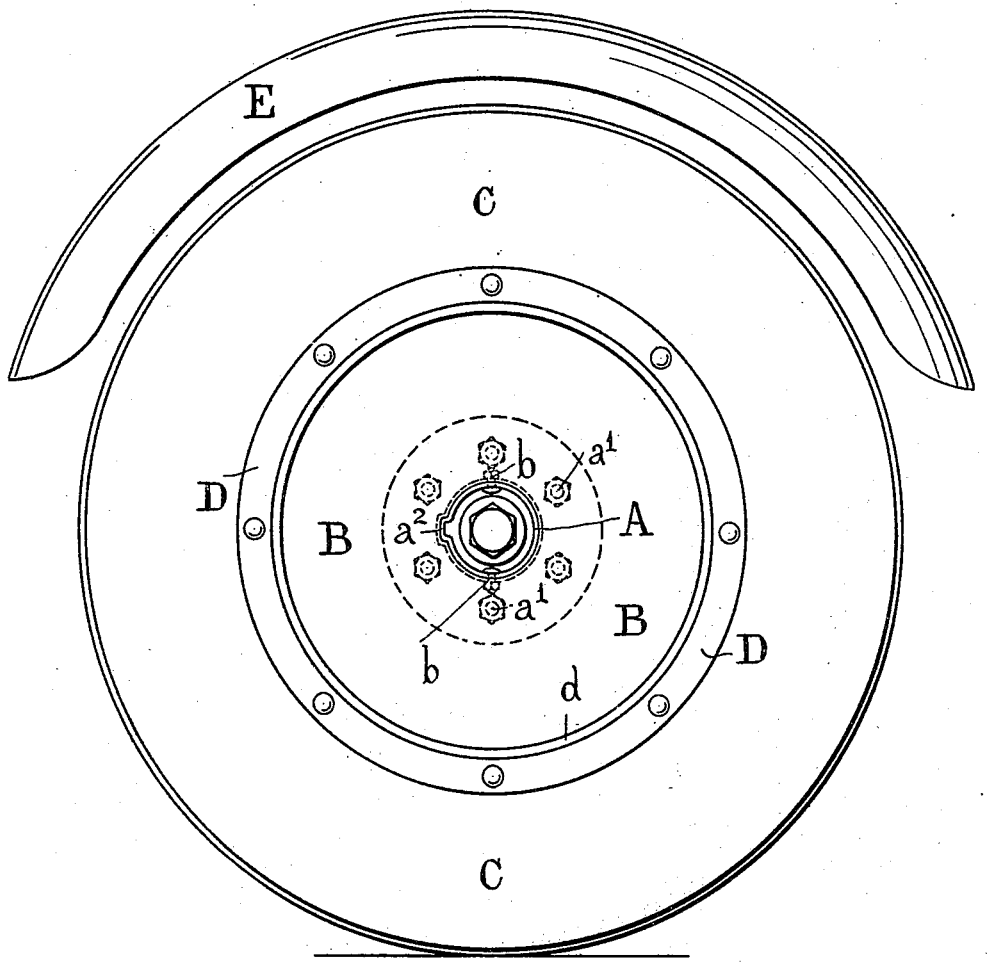
Fig. 1 is a side elevation of splash guard in position on wheel.
Figure 2:
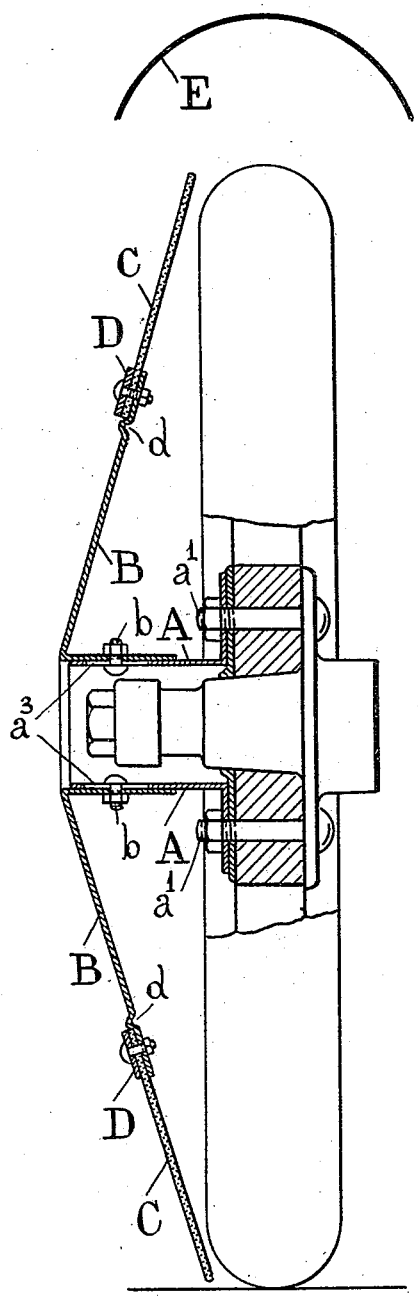
Fig. 2 is a transverse section.
Figure 3:
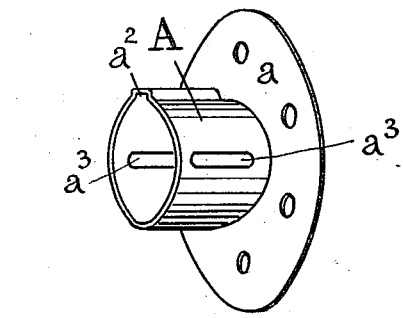
Fig. 3 is a detached view of the hub sleeve.
Figure 4:
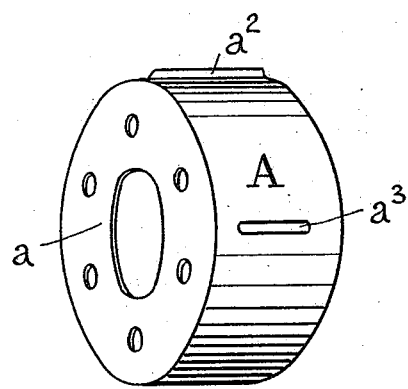
Fig. 4 is a detached view of a modified form of the hub sleeve.

A hub sleeve A is made of metal such as steel, iron or aluminium stamped or cast to fit over the hub of the wheel and with a flange or plate $a$ to abut or rest against the face of the wheel. The flange or plate $a$ is drilled with holes or slots to accommodate the holding bolts $a'$ by which the wheel is secured to its hub and the hub sleeve A is securely and firmly held in position by the same bolts. Instead of being secured or held by the hub bolts $a'$ the hub sleeve A may be bolted to the spokes of the wheel by suitably formed bolts or it may be bolted to an additional plate at the other side of the wheel or otherwise bolted or clamped thereto. The sleeve may be provided with rubs $a^2$ or corrugations on its periphery and is provided with holes or slots $a^3$ to receive bolts or screws $b$.

A dished plate or rim B of metal stamped or cast or of other stiff material is formed with a centre hub or sleeve to fit onto the hub sleeve A to which it is firmly secured by the bolts or screws $b$. The plate B is dished or inclined inwards from the hub towards the periphery of the wheel and is provided with holes near its periphery by which to attach a flexible rim C.

A flexible outer ring or rim C made of rubber or rubber composition or canvas, or other suitable flexible material to touch or nearly touch the road surface and give with any inequalities of the road or where pressure is put upon its periphery, is secured around the periphery of the dished plate B. The ring C may be flat or somewhat curved inward or dished to readily yield.

The flexible rim or ring C may be secured to the dished plate B by screws, bolts or rivets, but preferably clamped by a ring D bolted to the plate B.

The plate B is formed with an annular rib $d$ to retain the flexible ring C and the securing ring D concentrically on the plate B.

A circular rotary splash guard is thus built up and attached to the wheel to rotate with it, which will by the centrifugal action of rotation throw or carry the splash up into the wing E without any alteration thereto.

What we claim as our invention and desire to protect by Letters Patent is:—

A splash guard for the wheels of motor vehicles comprising in its construction a flanged sleeve A adapted to fit over the wheel hub and be attached to the wheel, a removably dished plate provided with a central inwardly extending hub sleeve adapted to fit over and be attached to the flanged sleeve A, means for securing the two sleeves together and a ring of flexible material attached to the periphery of the plate to catch the splash and throw it into the wing substantially as described.

In testimony whereof we have hereunto set our hands in presence of two subscribing witnesses.

F. J. HUNDLEBY.
HAROLD M. LAWSON.

Witnesses:
J. OWDEN O'BRIEN,
GEO. H. O'BRIEN.